United States Patent
Miriyala

(10) Patent No.: US 7,620,056 B2
(45) Date of Patent: *Nov. 17, 2009

(54) FLEXIBLE SCHEDULING OF NETWORK DEVICES WITHIN REDUNDANT AGGREGATE CONFIGURATIONS

(75) Inventor: Prasad Miriyala, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 893 days.

This patent is subject to a terminal disclaimer.

(21) Appl. No.: 10/603,500

(22) Filed: Jun. 24, 2003

(65) Prior Publication Data

US 2004/0008682 A1 Jan. 15, 2004

Related U.S. Application Data

(63) Continuation of application No. 09/281,621, filed on Mar. 30, 1999, now Pat. No. 6,618,377.

(51) Int. Cl.
*H04L 12/56* (2006.01)

(52) U.S. Cl. .............................. 370/395.54; 370/395.1; 370/395.52; 370/401

(58) Field of Classification Search .................. None
See application file for complete search history.

(56) References Cited

U.S. PATENT DOCUMENTS

| | | | |
|---|---|---|---|
| 5,473,599 A | 12/1995 | Li et al. | 370/16 |
| 5,633,869 A * | 5/1997 | Burnett et al. | 370/396 |
| 5,673,263 A | 9/1997 | Basso et al. | |
| 5,835,481 A | 11/1998 | Akyol et al. | 370/216 |
| 5,889,777 A * | 3/1999 | Miyao et al. | 370/395.52 |
| 5,964,838 A | 10/1999 | Cheung et al. | |
| 6,047,323 A | 4/2000 | Krause | |
| 6,070,191 A | 5/2000 | Narendran et al. | |
| 6,252,230 B1 | 6/2001 | Couland et al. | |
| 6,266,335 B1 | 7/2001 | Bhaskaran | |
| 6,292,905 B1 | 9/2001 | Wallach et al. | |
| 6,618,377 B1 * | 9/2003 | Miriyala | 370/395.1 |
| 6,665,304 B2 * | 12/2003 | Beck et al. | 370/401 |

OTHER PUBLICATIONS

T. Li, et al. "Cisco Hot Standby Router Protocol (HSRP)", Mar. 1998, RFC 2281.
M. Laubach, et al. "Classical IP and ARP over ATM", Apr. 1998, RFC 2225.

* cited by examiner

*Primary Examiner*—Jayanti K Patel
*Assistant Examiner*—Anthony Sol
(74) *Attorney, Agent, or Firm*—Weaver Austin Villeneuve & Sampson LLP

(57) ABSTRACT

A protocol is provided for backing up ATM network devices should they fail. The protocol is implemented in a system running ATMARP and supporting IP over ATM. In the protocol, multiple ATM network devices are combined in a "standby group" and share a common IP address. When an active member of the standby group fails, one of the other members of the standby group takes over ATM responsibility for the functions of the failed device. An ATMARP Server determines which member of a standby group should handle IP packets destined for that group.

52 Claims, 10 Drawing Sheets

FLEXIBLE SCHEDULING OF NETWORK DEVICES WITHIN REDUNDANT AGGREGATE CONFIGURATIONS

CROSS-REFERENCE TO RELATED APPLICATION

This application is a continuation of U.S. patent application Ser. No. 09/281,621 filed Mar. 30, 1999 in the name of Prasad Miriyala, now U.S. Pat No. 6,618,377 and entitled "FLEXIBLE SCHEDULING OF NETWORK DEVICES WITHIN REDUNDANT AGGREGATE CONFIGURATIONS," which is incorporated herein by reference in its entirety and for all purposes.

FIELD OF THE INVENTION

The present invention relates to systems and methods for maintaining network functionality when a critical network device fails. More specifically, the invention relates to groups of devices using a procedure for backing up an active device should that device become functionally unavailable.

BACKGROUND OF THE INVENTION

A computer network is a geographically distributed collection of interconnected communication links for transporting data between nodes, such as computers. By definition, a network is a group of computers and associated devices that are connected by communications facilities or links. Network connections can be of a permanent nature, such as cables, or can be of a temporary nature, such as connections made through telephone or other communication links. A plurality of computer networks may be further interconnected by intermediate nodes, or routers, to extend the effective "size" of the networks. A router is computer system that stores and forwards data packets from one local area network (LAN) or wide area network (WAN) to another. Routers see the network as network addresses and all the possible paths between them. They read the network address in a transmitted message and can make a decision on how to send it based on the most expedient route (traffic load, line costs, speed, bad lines, etc.). Routers typically communicate by exchanging discrete "packets" of data according to predefined protocols. In this context, a protocol comprises a set of rules defining how the nodes interact with each other.

The Asynchronous Transfer Mode (ATM) protocol establishes point-to-point connections over a virtual connection oriented media. A properly configured network device within an ATM system will include an ATM interface and a mechanism for establishing and supporting virtual connections or circuits. The appropriate hardware and/or software for providing ATM interfaces is generally known in the field. In 1991, an entity known as the ATM Forum was founded to standardize ATM technology. A substantial body of information regarding deployment of ATM technology is available from the ATM Forum. Cites to many references pertaining to ATM technology are available through the ATM Forum's World Wide Web site at www.ATMForum.com. Specific references include McDysan et al., "ATM Theory and Application," McGraw Hill, 1995; Minoi et al., "ATM & Cell Relay Service for Corporate Environments," McGraw Hill, 1994; and Prycker "Asynchronous Transfer Mode—Solution for Broadband ISDN, 2nd Edition, Ellis Horwood, 1993. Each of these references is incorporated herein by reference for all purposes.

Point-to-point connections between ATM nodes are made by "virtual circuits" or "virtual connections." A virtual connection may be a permanent virtual circuit (PVC) (e.g., a fixed line) or by a switched virtual circuit (SVC) (a temporary virtual connection). Since an SVC is temporary, it is established between two network devices of the ATM network 100 upon demand and then released after a predetermined time period. Note that the connection may include temporarily combining two PVCs and on either side of a switch capable of connecting the two PVCs.

An ATM network device has an ATM address, such as a VPI address or a VCI address, which is required by a network device in order to establish the SVC with a second virtual device. The ATM address will sometimes be referred to herein as a Network Service Access Point ("NSAP") Because PVCs dedicate network bandwidth to the two connected nodes (and preclude other nodes from using that bandwidth), PVC use is generally limited. Thus, to increase network applicability, many systems make use of SVCs. The process of establishing an SVC will be described broadly with respect to FIG. 1A.

FIG. 1A describes the process of establishing a virtual connection between a network device 104 and a network device 108. The network devices 104 and 108 have NSAP addresses of NSAP1 and NSAP2 respectively. To initiate the connection, the network device 104 constructs a 'SETUP' message 136 which indicates a desire to establish a connection with device 108, and sends it to the NSAP2 address. Message 136 may require multiple hops to reach device 108. To simplify the discussion, only a single hop is depicted here. As the SETUP message propagates toward its destination, the network acknowledges receipt of the message with CALL PROCEEDING messages at each hop. As shown, in FIG. 1B, network device 108 replies with a CALL PROCEEDING message 138 if it is merely a hop on the path to the ultimate destination or a CONNECT message 140 if it is the ultimate destination. In this case where NSAP2 is not the destination, another SETUP message is propagated to the next network device (not shown) along the path to the destination and a CALL PROCEEDING message returns from that device. This procedure continues until connection is made with the destination having NSAP2.

As the setup message 138 propagates to the eventual destination IP address along a number of network devices and switches, a PNNI protocol may be found. The destination may specify a set of protocol parameters of message transmission and return them with the CONNECT message. For example, an AAL5 platform with a 100 kBs bandwidth and a UBR service may be specified. If the network device 108 agrees to these parameters, the network device 108 will respond with a "CONNECT ACKNOWLEDGMENT" message 142. In this case, an SVC is established between NSAP1 and NSAP2 as well as between any additional switches along the pathway from NSAP2 to the destination. Once the virtual connections are established, data such as IP datagrams using ATM packets may be sent.

ATM can be used to run IP in a procedure referred to as IP over ATM. See Laubach, M. and Halpern, J., "Classical IP and ARP over ATM", RFC 2225, April 1998 (http://www.ietf.cnri.reston.va.us/home.html), which is incorporated herein by reference for all purposes. In IP over ATM, each ATM host in a set of hosts is assigned its own IP address. The set of ATM hosts forms a logical IP subnet ("LIS") which acts as a virtual LAN. All members of a LIS are directly connected to the ATM network and have the same IP network/subnet number and address mask. Hosts on the same LIS may exchange IP packets directly, but hosts on different ones are required to go through a router. A LIS may act as a bridge connecting existing LANs.

To move IP packets along a route from source to destination, in a conventional non-ATM IP network, an Address Resolution Protocol ("ARP") is used. See Plummer, D., "An Ethernet Address Resolution Protocol—or—Converting Network Protocol Addresses to 48.bit Ethernet Addresses for Transmission on Ethernet Hardware," STD 37, RFC 826, November 1982 (which is incorporated herein by reference). In such protocol, a network device holding a packet to be delivered asks its peers which one of them is responsible for handling packets having the IP destination address of the packet. The device makes this inquiry via an "ARP packet." The correct device replies via the Address Resolution Protocol with its hardware address. The device holding the packet then encapsulates that packet with a header indicating the hardware address of the responding device and sends the packet to it.

In SVC cases, devices must learn the ATM addresses of their peers in order to forward IP packets to them. The ARP protocol immediately suggests itself for this purpose. ARP, as currently implemented and described in RFC 826, requires a broadcast medium (e.g., Ethernet) on which to transmit the ARP request. ATM, which is a point-to-point protocol, cannot support ARP as described in RFC 826.

One suitable method for transmitting IP datagrams over an ATM network where the destination lower level address is unknown uses ATM Address Resolution Protocol ("ATMARP") as described in RFC 2225. ATMARP determines the lower level address of the next network device along a suitable path when given the destination IP address. An ATMARP system is typically comprised of an ATMARP Server and numerous ARP Clients who require assistance in transmitting to a destination IP address.

The ATMARP Server is typically responsible for determining the ATM address of the next network device along a suitable path when given the destination IP address. An ATMARP Client having a packet with a destination IP address needs to determine which of its ATM peers should serve as the next hop. It determines this by sending an ATMARP request to the ATMARP server, which resolves the request and returns the ATM address of the ATMARP Client serving as the next hop.

FIG. 1B illustrates the components of an ATM network 100 capable of running IP over ATM. The ATM network 100 includes an ATMARP Server 102. The server 102 is responsible for facilitating associations between ATMARP Clients 104, 106 and 108. Physically, the server 102 as well as the clients 104, 106 and 108 may be any conventional network device including routers or bridges. They may also be conventional hosts configured to run ATM.

Because individual ATM network devices are incapable of broadcasting an ARP message, the ATMARP Server 102 acts in conjunction with the network devices to facilitate transmission to a destination IP address. For example, the ARP Server 102 may return the appropriate ATM address (NSAP) when given an IP destination request by the ARP Client 104. For this purpose, the server 102 and the network device 104 are shown to have a virtual connection 112.

As an example of ATMARP, consider an IP message from a node handled by device 104 to a node handled by device 108. Device 104 has the message with its associated destination IP address but does not know which of its ATM peers should act as the next hop. To identify this device, network device 104 (IP address 1) sends an ARP request over the virtual connection 112 to the ATMARP Server 102 requesting the ATM address of the device handling transmissions to the destination IP address (IP address 3). The server 102 determines that IP address 3 corresponds to NSAP address 3 (device 108) and then responds, along the connection 112, with an NSAP address (NSAP3) corresponding to network device 108 (IP address 3). The NSAP address corresponding to network device 108 provided by the server 102 allows the network device 104 to set up a virtual connection 114 with the network device 108 and thus send the data packet. Typically, the ATMARP Server 102 is capable of providing an ATM address for each network device it is connected to.

FIG. 2 illustrates a problem that can arise using the ATMARP protocol on an ATM network such as the ATM network 100 illustrated in FIG. 1B. ATMARP Clients 104, 106 and 108 are distinguishable by NSAP addresses NSAP1, NSAP2 and NSAP3 respectively. ATMARP Clients 104 and 108 are coupled to external networks (networks beyond ATM network 100) such as Internet 206 and a private local network 210. In the illustrated environment, the ATMARP Client 104 may be a gateway router leading to the Internet 206, which includes an entity 206 connected to the Internet 206. The ATMARP Client 108 connects with the local network 210, which includes various network nodes such as an arbitrary entity 212.

When a data packet is to be sent from entity 208 to the arbitrary entity 212, a series of steps is taken in order to establish the required network connections. First, the packet from entity 208 must proceed through the relevant connections in the Internet 206 to reach network device 104. At this point, the packet must proceed through the ATM network 100 to reach the ATMARP Client 108. If the virtual connection does not exist, then the corresponding low level NSAP address is required to establish a virtual connection 114. First, the Client 104 may check an internal cache (corresponding to a list of ATMARP entries that may have been stored) to find the low level NSAP address. If it is not in the internal cache, the ATMARP Client 104 relays an ATMARP request specifying the IP address of device 108 to the server 102.

At this point, the ATMARP Server 102 checks whether there is an existing NSAP address for the destination IP address in a cache which stores existing external responsibilities of the ARP Clients it is responsible for. The ATMARP Server responds with the NSAP address for ATMARP Client 108. After the ARP Client 104 receives the ARP response corresponding to the ARP Client 108 NSAP address, the ARP Client 104 proceeds to establish a virtual circuit 114 with the ARP Client 108 in the manner described in FIG. 1A.

Suppose that ARP Client 108 malfunctions, breaks down or temporarily shuts down for service, and thus the virtual connection 114 cannot be made. The data package is thus incapable of reaching its destination and communication with nodes on network 210 via ATM network 100 is impossible. If ARP Client 108 is the sole link for handling access to local network 206, local network 210 is essentially shut off from all external communication. This inability to communicate will persist until the faulty network device is corrected. As there may be hundreds of network devices relying on the ATM link through device 108, this inability to communicate through a single non-functioning network device seriously compromises the effectiveness of ATM switching systems.

In view of the foregoing, a technique for protecting against failure of a network device in an LIS running ATMARP would be highly beneficial.

SUMMARY OF THE INVENTION

The present invention provides systems and methods for backing up ATM network devices should they fail. The invention may be conveniently implemented in a system running ATMARP and supporting IP over ATM. In the invention, multiple ATM network devices are combined in a "standby group" and share a common IP address. When an active member of the standby group fails, one of the other members of the standby group takes over ATM responsibility for the functions of the failed device. In the context of ATMARP, an ATMARP Server determines which member of a standby group should handle IP packets destined for that group.

The present invention relates in accordance with one embodiment to a method of providing a network service using a standby group of ATM network devices within an ATM network. Each ATM network device within the standby group has its own ATM address and shares a non-ATM network address with other members of the standby group. The method includes determining that a first member of the standby group of network devices is not available to provide the network service. The method also includes identifying a second member of the standby group of network devices to provide the network service.

The present invention relates in accordance with another embodiment to a method, for a single network device, of providing a network service using a standby group of ATM network devices within an ATM network. Each ATM network device within the standby group has its own ATM address and shares a non-ATM network address with other members of the standby group. The method includes sending a notification identifying the first network device by its ATM address and shared non-ATM network address. The method also includes receiving one or more packets destined for the shared non-ATM network address.

The present invention relates in accordance with another embodiment to a server for use in an ATM network including a plurality of network devices. The server includes one or more processors and at least one interface for establishing a connection between the server and a network device of the plurality of network devices. The server also includes a collection of entries, wherein each entry corresponds to a network device. The entry includes the corresponding network device's ATM address, a shared non-ATM address used by the corresponding network device and one or more other network devices, and a value used in determining whether the network device corresponding to the entry is currently acting as the device having the non-ATM address.

The present invention relates in accordance with another embodiment to a network device for use in an ATM network having a plurality of network devices and a server. The network device includes one or more processors. The network device also includes at least one interface for establishing a connection between the network device and a second network device. The network device further includes an ATM address and additionally includes a non-ATM address shared by at least one other network device of the ATM network.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
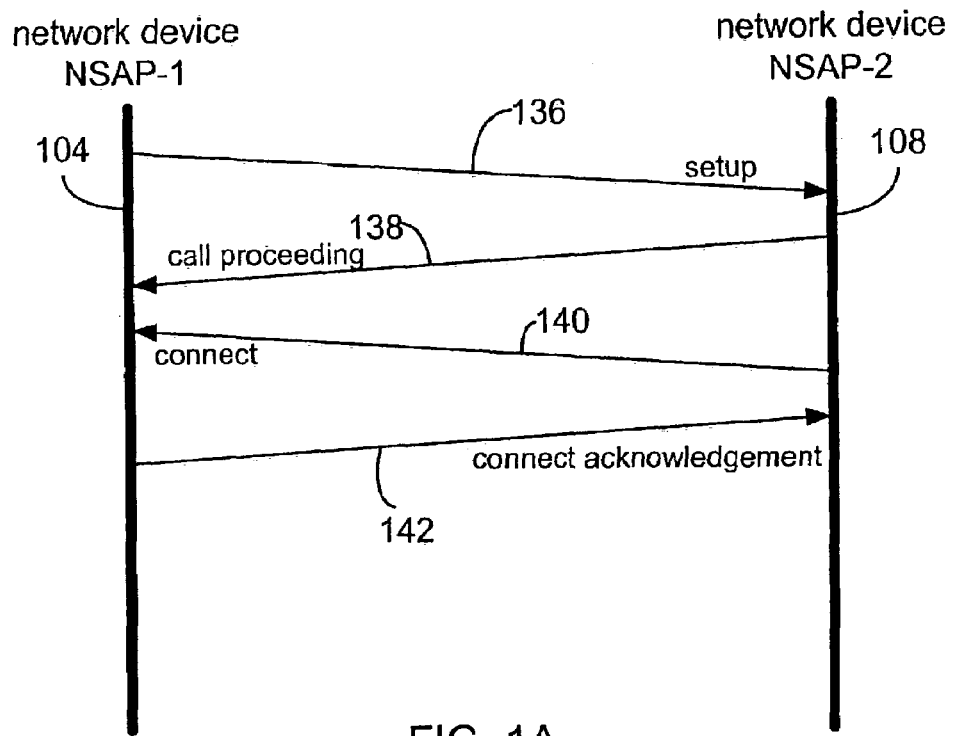
FIG. 1A describes the process of establishing a virtual connection between two network devices in a simple ATM network.
Figure 1B:
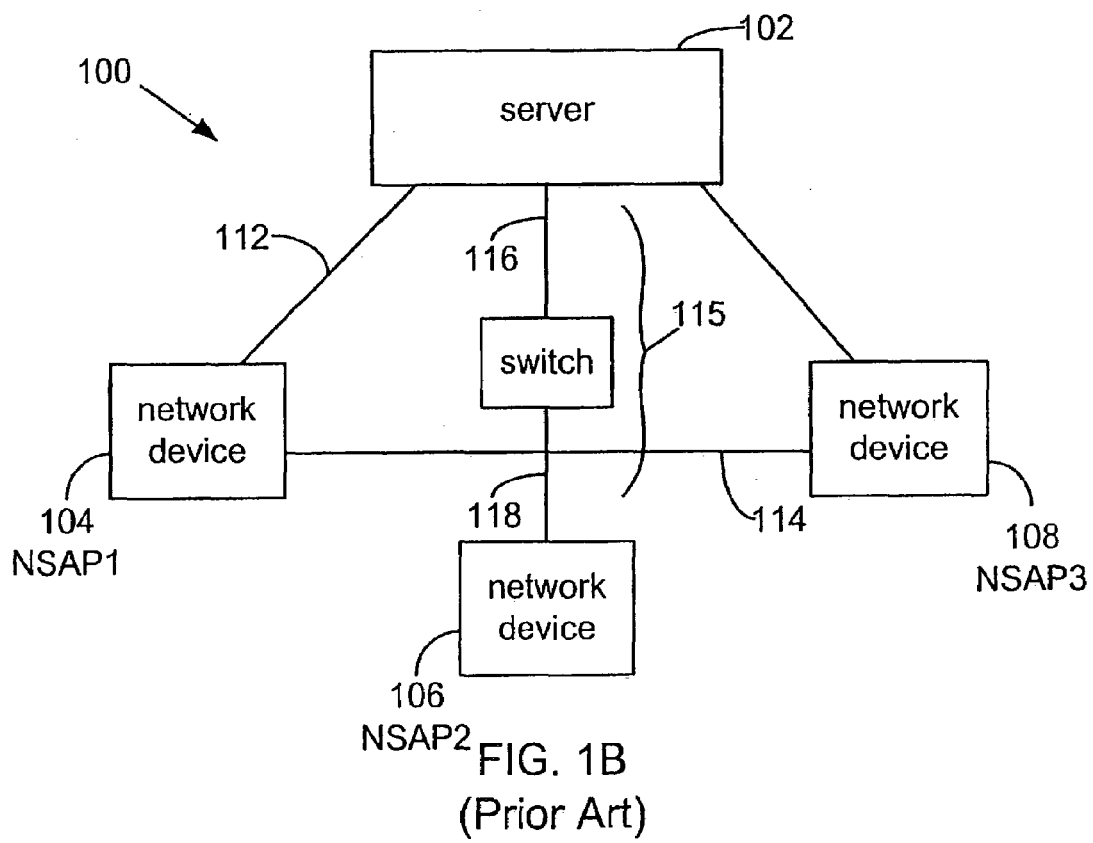
FIG. 1B illustrates the components of a simple ATM network that supports ATMARP.
Figure 2:
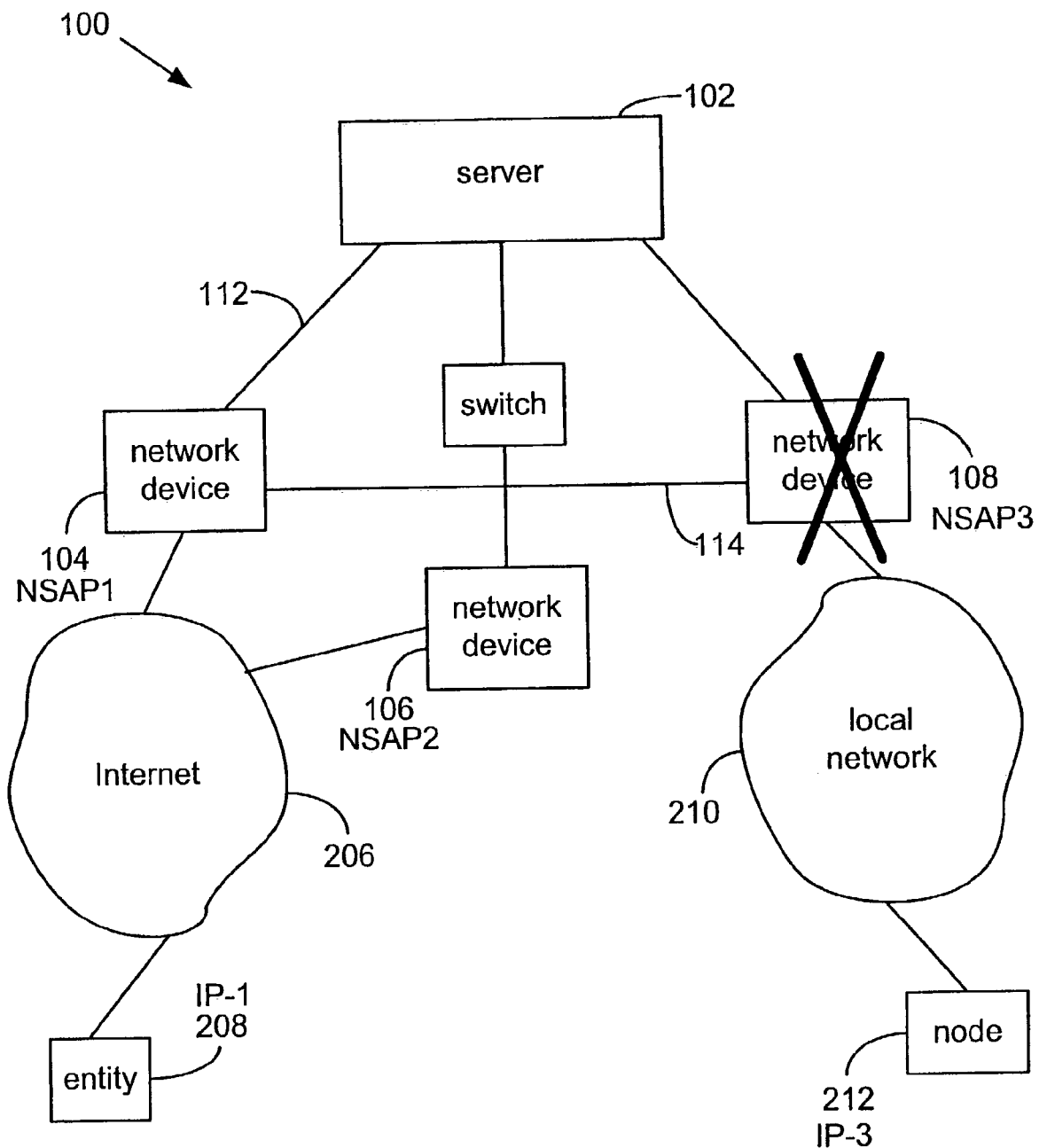
FIG. 2 illustrates a problem that can arise if one of the ATM nodes fails in the network shown in FIG. 1B.

In the following detailed description of the present invention, numerous specific embodiments are set forth in order to provide a thorough understanding of the invention. However, as will be apparent to those skilled in the art, the present invention may be practiced without these specific details or by using alternate elements or processes. In other instances well known processes, procedures, components, and circuits have not been described in detail so as not to unnecessarily obscure aspects of the present invention.

The present invention provides a standby group of ATMARP clients, which together reduce the likelihood of a network transmission failure due to the unavailability of a single network device. The ATMARP Clients may run IP over ATM and may share an IP address. When one device running IP breaks down, the effectiveness of the ATM network (or network portion such as a LIS) running IP is not compromised. The grouping of network devices may provide one or more redundant ATM devices for an IP address. The entire standby group may be viewed as a virtual ATMARP Client within the network. Typically, the groups are organized such that a primary network device assumes the functions of the shared IP address and the remaining network devices in the group are in a standby state ready to take over the functions in the event that primary network device is unavailable. The device currently handling the responsibilities of the shared IP address will be referred to herein as a "primary" or "active" network device.

In a specific embodiment, the present invention is implemented by configuring all the ATMARP Clients with a shared IP address (usually in addition to one or more other IP addresses) and distinct priority levels in order to derive an implementation order. In such a design, the available network device having the highest priority for the group is responsible for the responsibilities of the primary network device. Such responsibilities include, for example, routing IP packets to and from a local network or network segment. Such segment need not run ATM. Alternatively, the IP address may represent a LAN entity on an ATM network (or LIS) emulating a LAN. An ATMARP Server keeps track of the network devices, their corresponding addresses and required group information. Thus, upon failure of the primary network device for a particular group, the server may readily direct a client to an alternate network device.

Note that the invention is illustrated by an ATMARP protocol implemented in an IP over ATM network. The invention need not be so limited. Generally any ATM network running a network layer or other higher level protocol may profit from this invention. Thus, the network addresses resolved by a server, as described herein, need not be IP addresses in some embodiments. Further, the client-server protocol need not be an ARP protocol. As long as the server is providing some service to ATM clients and those clients can profit from a standby group, the invention may be applicable. In a preferred embodiment, the invention employs many of the processes described in RFC 2225 and subsequent descriptions of ATMARP protocols.

Figure 3:
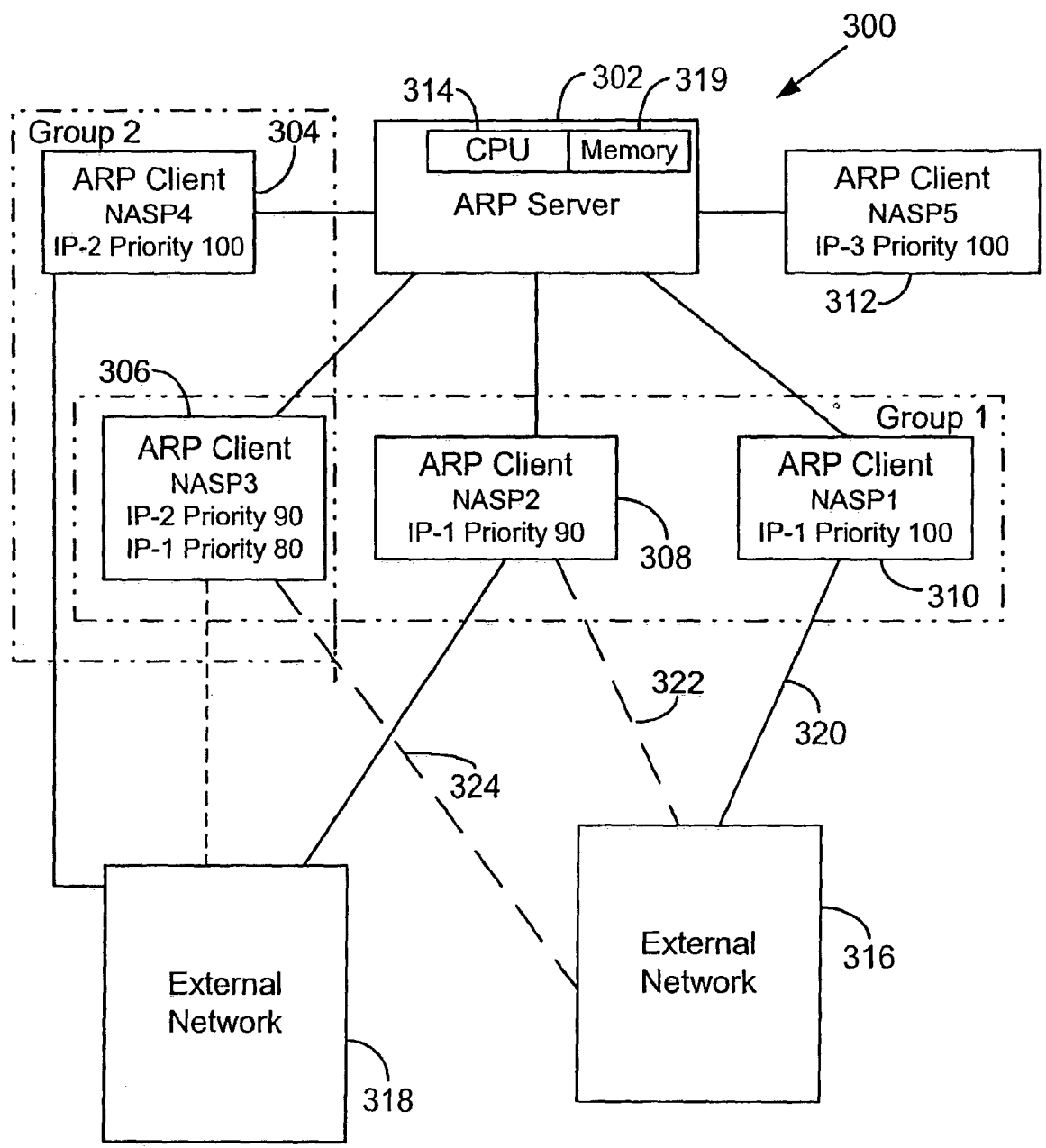
FIG. 3 illustrates an ATM system including standby groups in accordance with one embodiment of the present invention.

FIG. 3 illustrates an ATM network group 300 (e.g., an LIS) in accordance with one embodiment of the present invention. The ATM system 300 is capable of implementing the ATMARP protocol and includes an ATMARP Server 302, which is responsible for implementing ARP protocol together with ARP Clients 304, 306, 308, 310 and 312. A standby group is defined as a set of ATMARP Clients sharing a common non-ATM or lower level address (e.g., they share an IP address). For example, a group may be responsible for routing traffic to and from an external network such as a WAN, LAN, or the Internet. In FIG. 3, a Group 1 includes ARP Clients 306, 308 and 310 and assumes the responsibilities of an IP address denoted "IP-1" herein. More specifically, standby group 1 is responsible for communication to and from an external network 316. Network group 300 also includes a Group 2 that includes ARP Clients 304 and 306 and assumes the responsibilities of an IP address denoted "IP-2" herein. Group 2 is responsible for communication to and from an external network 318. Note that the IP routing protocols used by the ATM devices in group 300 may be configured to direct packets addressed to external network 316 through a device having the network address IP-1 and to direct packets addressed to external network 318 through a device having the network address IP-2.

To specify an active device within a standby group, each ARP Client within that group may be given a value distinguishing it from the other ARP Clients in the group. For example, the value may be a priority configured relative to the other ARP Clients within a group. In this case, the priority indicates the order in which the individual ARP Clients within the group are implemented to service the IP address corresponding to the group. For Group 1, ARP Clients 310, 308 and 306 are assigned priority values of 100, 90 and 80 respectively. With this priority designation, the available ARP Client having the highest priority would be the primary ARP Client and would be responsible for servicing the shared IP address (IP-1) associated with Group 1. In the event that the highest priority ARP Client cannot function properly or is unavailable to service the IP address, the ARP Client corresponding to the next highest priority will service the IP address. In other words, upon functional failure of the ARP Client 310 to transmit data within the ATM network 300 or across a connection 320 to external network 316, the ATMARP Server 302 may designate ARP Client 308 to handle traffic (via a connection 322) to and from external network 316.

Similar to Group 1, the clients within Group 2 also provide redundant virtual connection capabilities to the external network 318. In this case, ARP Client 304 normally acts as the primary ARP Client for Group 2 since it has the highest active priority. The ARP Client 306 acts as a standby in the event of failure of the ARP Client 304 to allow an alternative communication path leading to the external network 318.

It is important to note that a single ARP Client may be responsible for multiple IP addresses or network connections. For example, the ARP Client 306 maintains standby status with respect to Group 1, as well as a standby status with respect to Group 2. It must possess the shared IP addresses for both of these standby groups (i.e., IP-1 and IP-2). It may possess other IP addresses (not illustrated) that it uses in other roles. Thus, it is entirely possible that an individual ARP Client may be responsible for routing traffic simultaneously over multiple IP addresses. Further, at any given instance in time, a single ATM device may be the active device in two or more standby groups. For example, in the event that the ARP Clients 310 and 308 are shut down for servicing, coupled with failure of the ARP Client 304, ARP Client 306 will be dually responsible for servicing connections to and from external networks 316 and 318.

As two ARP Clients within a group may have the same IP address, distinguishing the two is thus the responsibility of the ATMARP Server 302 using the relevant lower level address system. For example, in addition to the IP address designations, ARP Clients 310, 308 and 306 may have NSAP address designations of NSAP-1, NSAP-2 and NSAP-3, respectively.

The ATMARP Clients may be any type of network device configured to handle ATM traffic. Common examples include routers, switches, cable modem termination systems, and the like. Note that the invention is not limited to devices devoted entirely to routing or otherwise controlling network traffic. The invention may also apply to work stations, personal computers, laptop computers, and other such devices that can run ATM and another network protocol such as IP.

Specific ATM-capable hardware includes the 7000 series of routers and the LightStream® line of ATM switches available from Cisco Systems, Inc. of San Jose Calif. In addition, add-on ATM adapters are available from Cisco Systems and other companies providing networking equipment.

The ATMARP Server 302 may generally be any server that provides ATMARP information for a collection of ATMARP Clients, which look to it for such configuration information. Preferably, the ATMARP information is arranged such that the relevant information is stored in non-volatile memory. One way of achieving this result is through a cache or list of entries for the ATMARP Clients. The cache may include such standard ATMARP information as the NSAP addresses and associated IP addresses of the individual ATMARP Clients. It may, in addition, include respective priorities of the individual ARP Clients. An arrangement of ATMARP entries suitable for implementation of the present invention will be described with reference to FIG. 6A.

An ATMARP Server 302 suitable for implementing the present invention may include a central processing unit (CPU) 314, memory 319, and one or more ATM interfaces (not shown). When acting under the control of appropriate software or firmware, the CPU 314 is responsible for such router tasks as routing table computations and network management. It may also be responsible for issuing ARP Client communications, applying configuration data, etc. It preferably accomplishes all these functions under the control of software including an operating system (e.g., the Internetwork Operating System (IOS®) of Cisco Systems, Inc.) and any appropriate applications software. Memory 319 stores configuration information for server 302 and may also store the list of ATMARP entries described above.

Server 302 may be a conventional computer or workstation outfitted with one or more appropriate ATM interfaces or it may be router or other network device. Further structural details of a workstation embodiment are presented in FIG. 10A and further structural details of a network device embodiment are presented in FIG. 10B.

The aggregation of individual ARP Clients into standby groups may be undertaken by configuring appropriate entries in the ATMARP server 302 and by configuring the appropriate IP addresses on the ATMARP Clients of the standby group. As mentioned, a logical representation of ATMARP server entries is presented in FIG. 6A and described below. Individual ATMARP Clients may be configured with standby or shared IP addresses in the same manner that they are configured with any IP address. In one embodiment, the Dynamic Host Configuration Protocol (DHCP) is employed. See RFC 2131, which is incorporated herein by reference for all purposes.

Various criteria may be employed to determine membership in standby groups and priority designation of individual ATMARP Clients making up the standby groups. For example, the anticipated traffic to and from external network 318 may be used in determine which clients and how many clients should be used in a standby group. If the external network will have a high volume of traffic, the standby group may include multiple high capacity ATMARP clients. Other criteria influencing the likelihood of failure of any device within the standby group, the service schedule of the devices, etc.

Algorithms may be applied in any manner as to aid in allocating of the ARP Clients within the ATMARP system 300. As the number of ARP Clients within the ATMARP system 300 may number in the hundreds, ARP Client configurations within the ATMARP network 300 based on software algorithms becomes more valuable as the ATMARP network 300 complexity grows.

In many applications it is common for an ATMARP Client to be responsible for a high volume of traffic—at least temporarily. To facilitate the efficient transfer of data over the potentially overloaded ATMARP Client, load sharing among individual ARP Clients within the ATMARP system 300 may be implemented. For example, if the ATMARP Client 310 servicing external network 316 is periodically responsible for handling an excessive amount of data which may compromise the transmission of data, the system (or an administrator) may designate an alternate ATMARP Client such as ARP Client 308 to facilitate efficient data transmission. Together, Clients 310 and 308 serve as a standby group for the purpose of load sharing.

Alternately, load sharing may be implemented between groups of the present invention. For example, for the case in which the External Entities 316 and 318 respectively represent two excessively large networks such as a large company's WAN or the Internet, the ATMARP system 300 will be responsible for the large Volume of data being transmitted between the two entities. For the illustrative case in which twenty ARP Clients are included in Group 1 which are normally responsible for Internet communication, and three ARP Clients are included in Group 2 which are normally responsible for the WAN External Entity, load sharing may be implemented between Group 1 and Group 2.

As mentioned, virtual connections in an ATM network may be classified as either a permanent virtual connection (PVC) or a switched virtual connection (SVC). A PVC is a virtual connection that does not change over time and is analogous to a leased line. Alternately, an SVC is a temporary virtual connection. Thus, SVCs are continually established within the network 300 and maintained as necessary for a suitably finite period of time. More specifically, the SVCs may be flexibly dissolved at a predetermined time in order to ease overhead within the ATM system. For example, a SVC may be specified to have a duration of five seconds. Further, for SVCs that are continually used, the duration may be much longer, or reset upon use, in order to reduce SVC establishment overhead within the ATM system.

Note that SVCs fall into various service categories, of different costs, including CBR (Constant Bit Rate), VBR (Variable Bit Rate), ABR (Available Bit Rate), and UBR (Unspecified Bit Rate). The type of service chosen typically depends upon the type of data being transferred. For example, audio or video transmission is conventionally sent using CBR or real-time VBR, while background file transfer is usually made using UBR.

Figure 4:
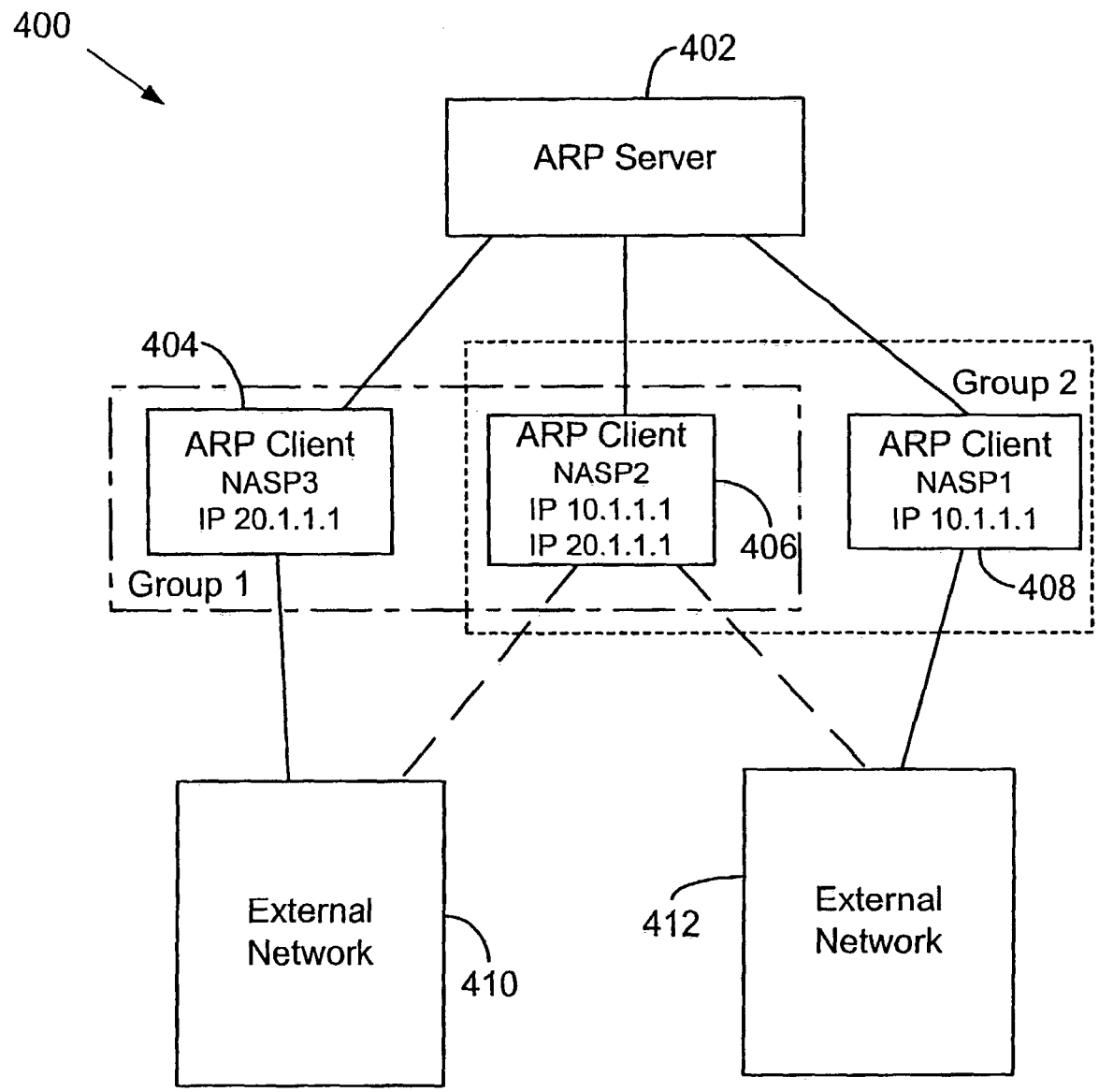
FIG. 4 illustrates two standby groups of ATMARP Clients, each capable of servicing a separate group of nodes and each having a unique IP address.

FIG. 4 illustrates an ATMARP LIS 400 capable of serving two separate groups each corresponding to a unique IP address. For example, Group 1 includes ARP Clients 404 and 406 and is responsible for servicing an IP address of 20.1.1.1. Group 2 includes ARP Clients 408 and 406 and is responsible for servicing an IP address of 10.1.1.1. A set of External Entities 410 and 412 employ the ATM services Group 1 and Group 2 respectively. For example, the External Entities 410 and 412 may represent two large WAN networks for a very large company. Or they may represent large computers that require ATM services. In the case of transmission between the External Entities 410 and 412 where the ARP Client 404 and the ARP Client 408 both go down or are unable to carry out transmission, service to and from both External Entities 410 and 412 must be solely serviced by the ARP Client 406.

The number of IP interfaces for a specific ATMARP Client will depend on the particular router (or other network device) used. In order for such device to serve in a standby group and carry out other dedicated functions outside the group, it must present multiple IP addresses. In one embodiment, separate interfaces within a given network device are used for a standby IP address and a second IP address. Some network devices, such as a Cisco 3810 router, provided by Cisco Technology, Inc. of San Jose, Calif., have only a single interface. One manner in which to implement the present invention is to divide an interface into multiple sub-interfaces, each having a separate IP address.

Figure 5:
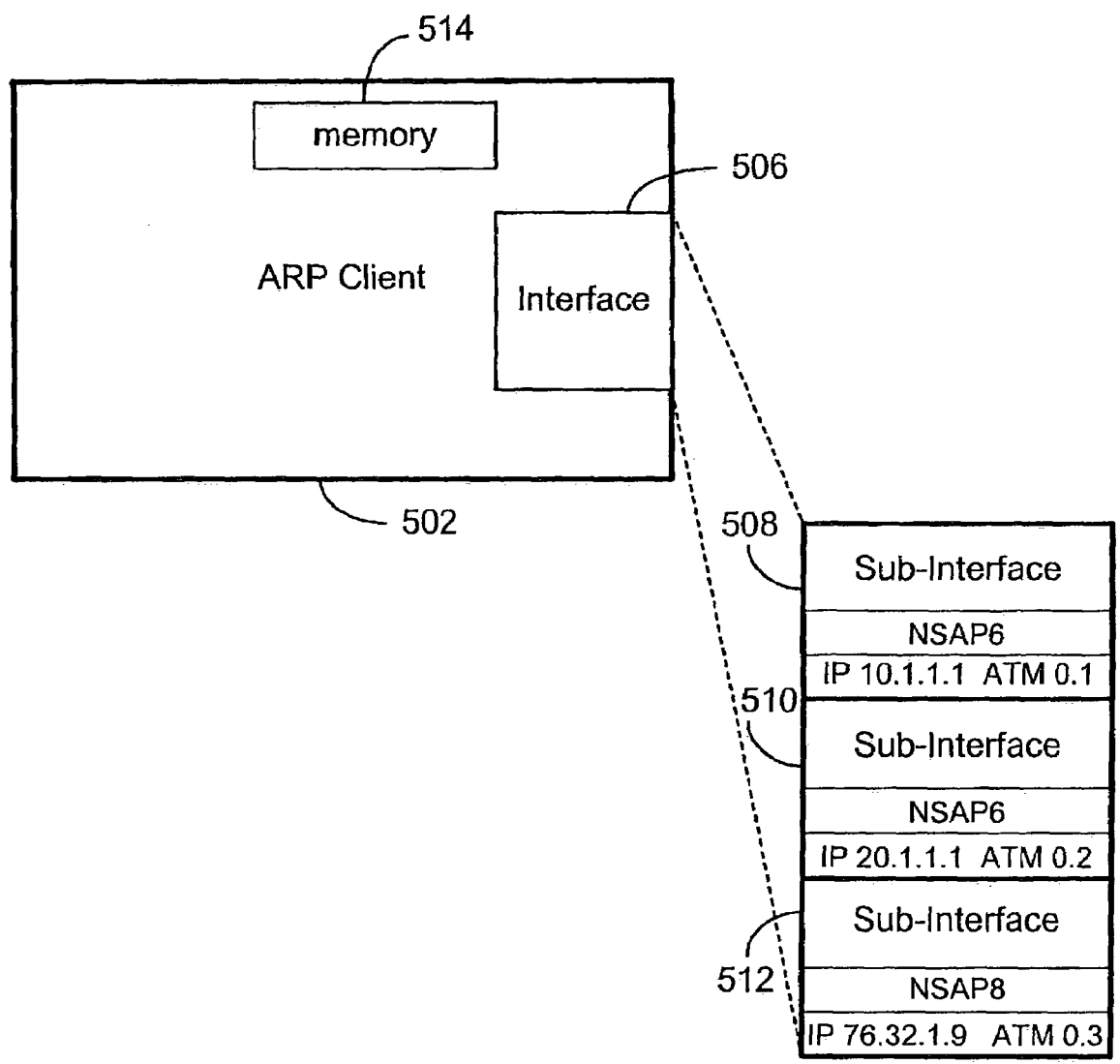
FIG. 5 illustrates a sub-interface structure of an ARP Client suitable for supporting multiple IP addresses in accordance with one embodiment of the present invention.

FIG. 5 illustrates an ATMARP Client having a sub-interface system in accordance with one embodiment of the invention. For an ARP Client 502 with one interface 506, the interface 506 may be divided into sub-interfaces 508, 510 and 512 wherein each sub-interface presents an individual IP address. Each sub-interface is capable of providing the transmission capabilities required for a normal IP interface. The IP address of each sub-interface is mapped to an NSAP address, which may be repeated between sub-interfaces of the Client 502. For example, the IP addresses for sub-interfaces 508 and 510 correspond to NSAP6 while the IP address for sub-interface 512 corresponds to NSAP8. It is important to note that while an IP address is shared among the members of a standby group within the ATM system 300, the lower level NSAP addresses (ATM addresses in this case) normally are not shared within a group. Note that a single device may reside in two or more standby groups, and therefore one of its NSAP addresses may appear in two distinct standby groups.

For ATM interface 506, each sub-interface has at least one IP address corresponding to a unique transmission responsibility. For example, a sub-interface 508 (denoted ATM 0.1) may specify an IP address of 10.1.1.1 and be responsible for routing all video data to and from an External Entity using classical IP. A sub interface 510 (denoted ATM 0.2) may have an IP address of 20.1.1.1 and may be responsible for LAN emulation on an ATM network. A third interface 512 (denoted ATM 0.3) may be represented by an IP address of 76.32.1.9 and may be responsible for video and voice transmission.

One method of implementing sub-interfaces 508, 520 and 512 for a single hardware interface 506 is using software. The structure may be stored in any suitable non-volatile memory 514 located within the ATMARP Client 502.

Figure 6A:
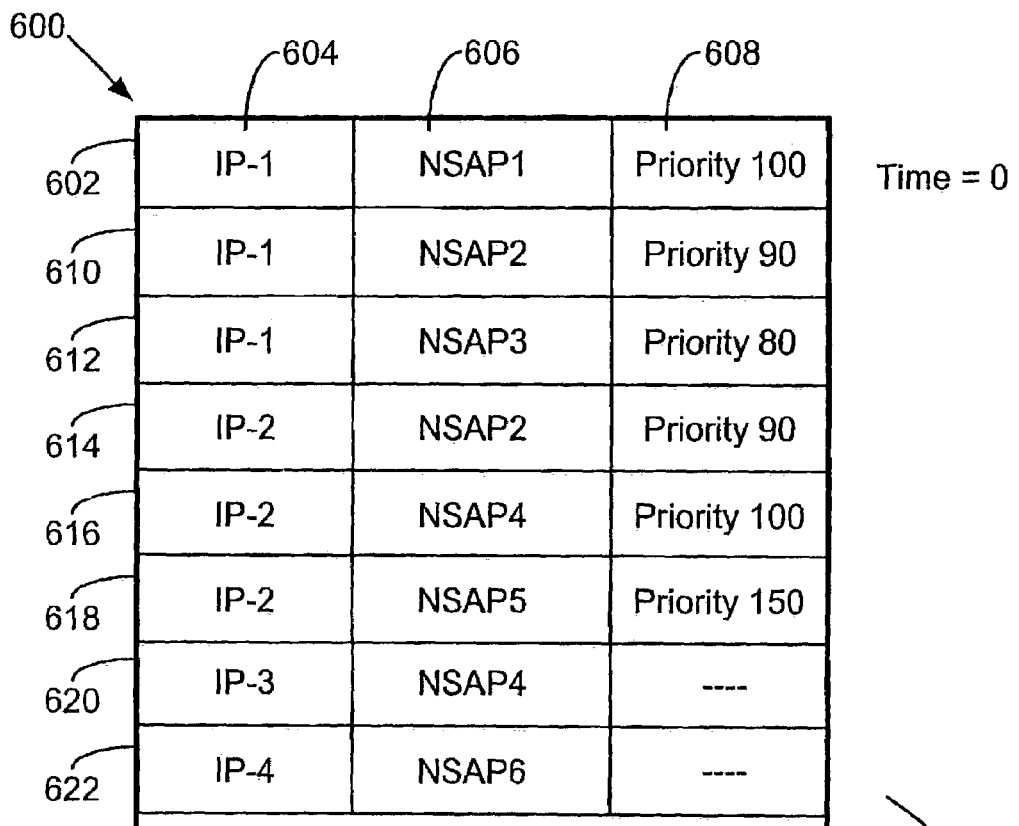
FIG. 6A illustrates a cache or table in which the ATMARP Server maintains a table of information including information for each ARP Client in the ATM system in accordance with one embodiment of the present invention.

FIG. 6A illustrates a collection of entries 600, arranged in table format, in which the ATMARP Server 302 maintains information for each ATMARP Client in the ATM system 300. The collection 600 may be stored or cached in the non-volatile memory of the ATMARP Server 302. The collection of entries 600 includes an entry for each unique interface in an ARP Client within the system 300. Thus, the entries 602, 610, 612, 614, 616, 618, 620 and 622 each represent a unique interface corresponding to a unique combination of an IP address and an NSAP address within the ATMARP network 300. Each entry in table 600 includes an IP address component 604, an NSAP address component 606 and a priority component 608. Each of these components may be provided in a field having the necessary number of bytes for unambiguously designating its respective address or priority.

Note that the table includes eight separate NSAP addresses, which may correspond to eight separate ARP ATM Clients. A first standby group, specified by entries 602, 610, and 612, shares the IP address denoted by "IP-1" and includes devices having ATM addresses given by NSAP1, NSAP2, and NSAP3. Within this group, the device denoted by NSAP1 is the active device because it has a higher priority than any of its peers in the group. A second standby group, specified by entries 614, 616, and 618, shares an IP address denoted by "IP-2" and includes devices having ATM addresses denoted by NSAP2, NSAP4, and NSAP5. The device denoted by NSAP5 is the active device in this group because it has the highest priority. Note that the device specified as NSAP2 participates in both standby groups. Entries 620 and 622 in table 600 specify ATMARP Clients that are not participating in any standby groups. This is evident by the fact that they have IP addresses that do not appear in any other entries in table 600. Note also that they do have associated priorities.

Figure 6B:
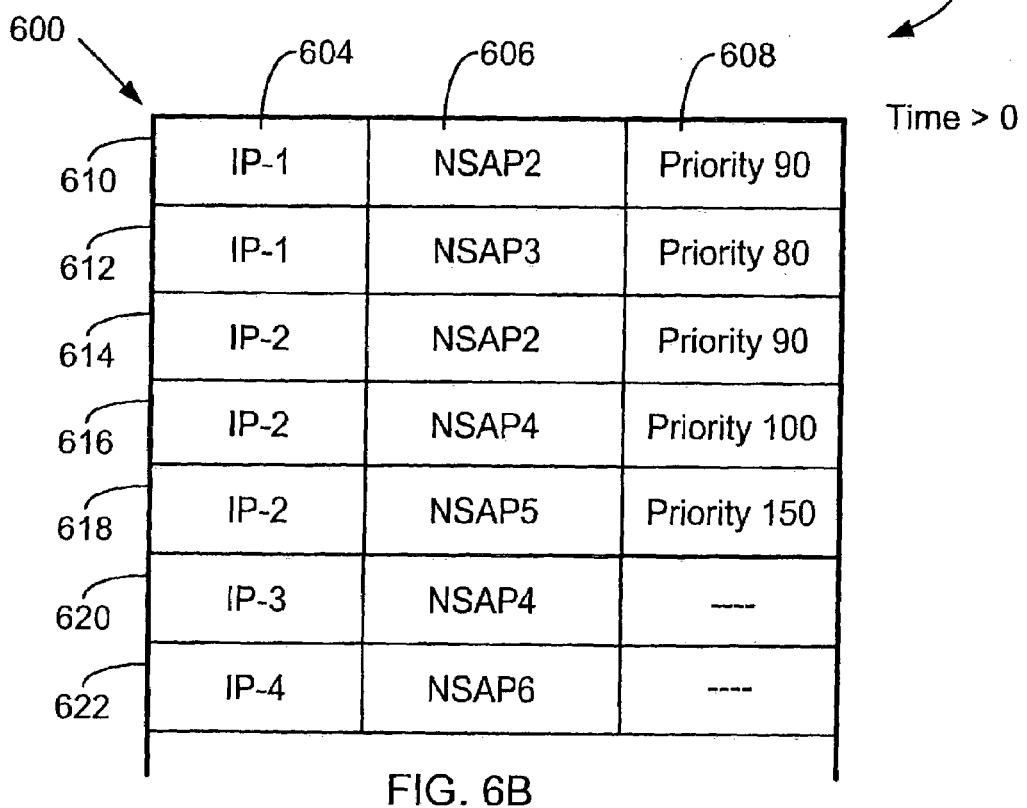
FIG. 6B illustrates the cache of FIG. 6A at a later time after one of the server's ATMARP Clients' has failed.

FIG. 6B illustrates the table 600 of FIG. 6A at a subsequent time. During this subsequent time, one of the individual ARP Clients has become unavailable within the ATM network 300. In this example, the ARP Client 310 corresponding the NSAP address of NSAP1, which is currently the primary ARP Client for Group 1 (which is responsible for servicing IP-1), may be shut down for service. The ATMARP Server 302 may thus adjust the table 600 to reflect the non-availability of the ARP Client 310. As illustrated in FIG. 6B, the entry 602 corresponding to the ARP Client 310 is removed from the table 600 until the ATMARP Client 310 again becomes available. Correspondingly, the next highest priority ATMARP Client within Group 1 may be designated as the primary ARP Client for IP-1 (ATMARP Client 2). Similarly, upon the notice of availability of ARP Client 310, the table 600 may add the entry 602 and thereby reinstate the ARP Client as the primary ARP Client for Group 1. Thus, the table 600 may facilitate the implementation of alternate network devices in order to avoid single network device dependency on order to maintain communication with the external network 316.

The table 600 is one suitable example of how the ATMARP Server 302 may maintain priority scheduling of the ATM system. The server may use any suitable table, chart or data management system capable of managing the ATMARP Clients flexibly according to their redundant availability. For example, rather than deleting entries that have become unavailable, the system may provide an additional component such as an "availability flag" for each entry in table 600. The flag may be, for example, a one-bit tag added to or within the entry that signals the availability of an ATMARP Client. Obviously, alternate methods of configuring and manipulating the information required in scheduling the network devices within an ATM network can be easily implemented, as one skilled in the art would appreciate.

In order to maintain the table 600 within the ARP system 300, each individual ARP Client may be responsible for informing the ATMARP Server 302 of its availability. For example, a message may be sent on a periodic basis, which informs the ATMARP Server 302 of the functional status of an individual ARP Client. A "KEEP ALIVE Message" is a periodic message sent by an ARP Client that signals the availability of the ATMARP. Client when processed by the ATMARP Server 302. If a KEEP ALIVE Message is not received for an individual ATMARP Client within a specified time period, then the negligent ARP Client may be considered unavailable and may be removed from the cache 600.

The temporally based signals may be sent at flexibly predetermined time periods in order to reduce system traffic or increase system maintenance resolution. Additionally, other manners of ARP Client health reporting may be administered. For example, ARP Clients may be probed by the ATMARP Server 302 sequentially according to their location within the table 600.

Figure 7:
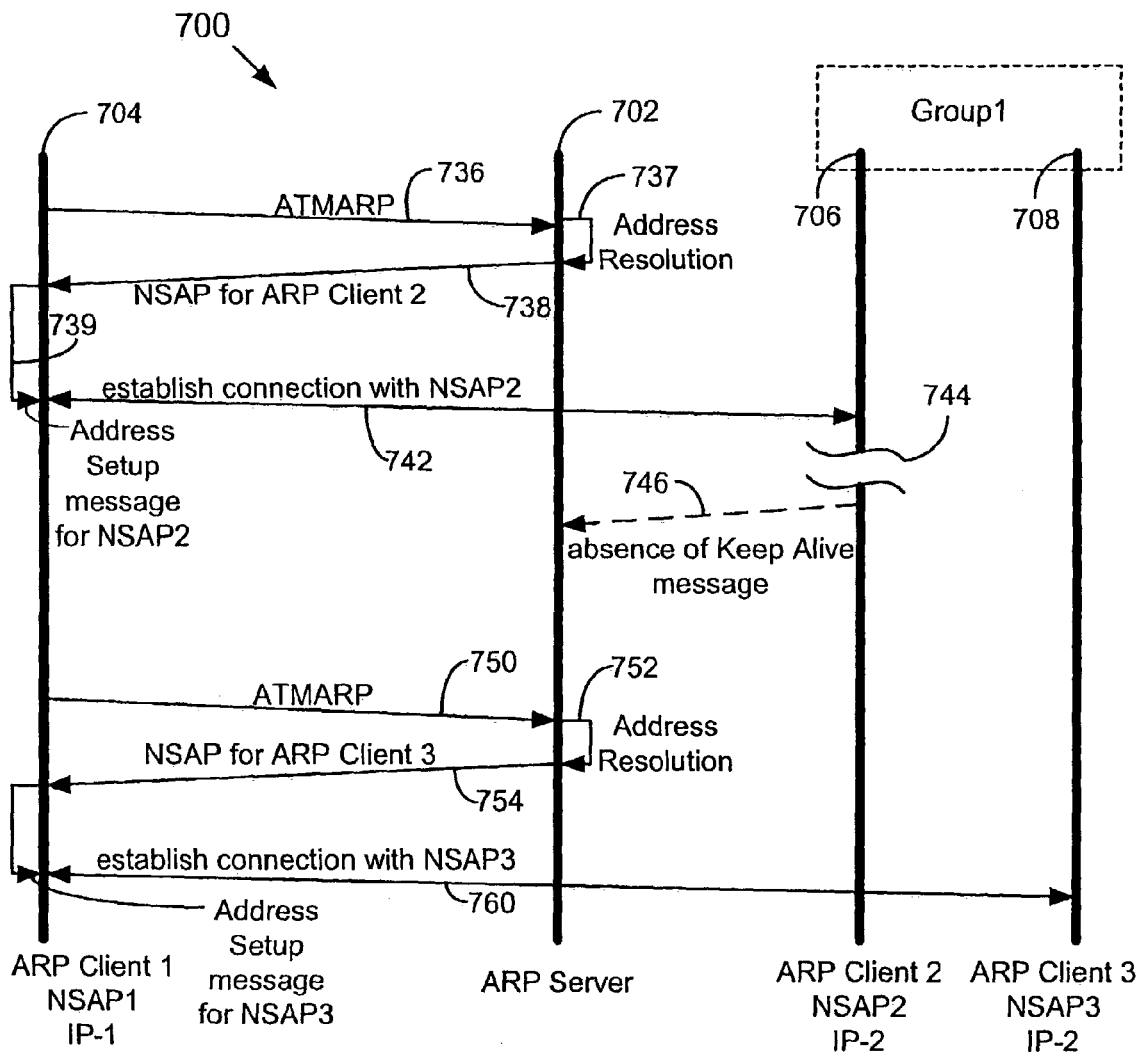
FIG. 7 illustrates a method in which the ATMARP Server uses a standby ATMARP Client upon non-response or unavailability of a primary ATMARP Client within a standby group.

FIG. 7 illustrates a method 700 in which an ATMARP Server 702 schedules a standby ATMARP Client 708 upon non-response or unavailability of a primary ATMARP Client 706 client in accordance with one embodiment of the present invention. An ATMARP Client 704 having IP-1 address and NSAP1 address desires to transmit data with an ATMARP Client having an IP address of IP-2. This IP address is shared by ATMARP Client 706 (ATM address NSAP2) and ATMARP Client 708 (ATM address NSAP3). Together clients 706 and 708 form a standby group 1 using an IP-2. Group 1 may also include other ARP Clients configured with the IP-2 address. ATMARP Client 706 acts as the primary ATMARP Client within Group 1 while the ARP Client 708 has the second highest priority within the group 708 and is currently on standby.

To make connection with the device acting on behalf of IP address IP-2, ARP Client 704 initially sends an ATMARP request (736) to the ATMARP Server 702 requesting the NSAP address of the device configured as IP-2. In accordance with conventional ATMARP protocol, the ATMARP Server 702 performs address resolution (737) to identify the NSAP address of the active device corresponding to destination IP address of the request (IP-2). Note that ATMARP Server 702 may update its entry for ATMARP Client 1 with information about that client contained in the ARP request.

Thereafter, ATMARP Server 702 then sends an ATMARP reply (738) containing an NSAP address (NSAP2) to the ATMARP Client 704, thereby enabling the ARP Client 704 to establish a virtual connection with the ARP Client 706. Upon receipt of the NSAP2 address from the ATMARP Server 702, the ARP Client 704 configures a setup message (739) for the ARP Client 706. In a manner analogous to that described with reference to FIG. 1A, a virtual connection is established (742) between the ARP Client 704 and the ARP Client 706.

Subsequent to the establishment of the virtual connection 740, the ARP Client 706 goes down (744). At the next subsequent time-out period, the ARP Client 706 will not broadcast a KEEP ALIVE Message (746). As described above, notice of the unavailability of the ARP Client 706 is established within the ATMARP Server 702 due to the lack of a KEEP ALIVE Message. The ATMARP Server 702 then removes the ARP Client 706 as the primary ARP Client for Group 1 and promotes the standby ARP Client 708 to service the IP-2 address.

At a subsequent time, the ARP Client 704 is required to deliver another data package to a device having an IP address of IP-2. Similar to the case above, after determining that an NSAP address is not available in its local cache, the ARP Client 704 sends an ATMARP request (750) to the ATMARP Server 702. After address resolution (752), the ATMARP Server 702 then responds (754) with the NSAP3 address corresponding to the ATMARP Client 708. The ARP Client 704 then addresses the NSAP address received from the ATMARP Server 702 (756) and prepares a setup message (760) to establish a virtual connection 758 with the ATMARP Client 708.

Figure 8:
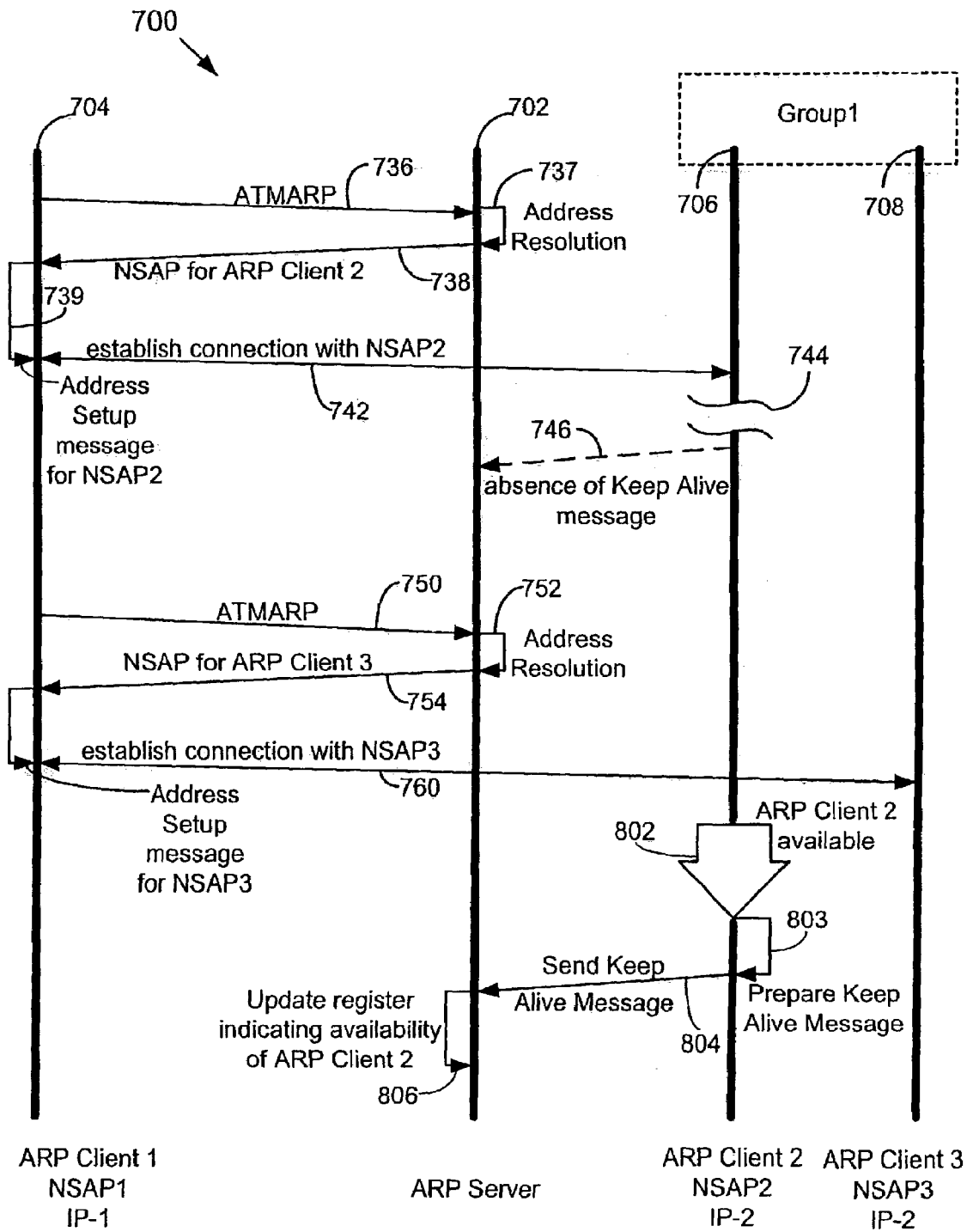
FIG. 8 illustrates an extension of the method of FIG. 7 subsequent to the return of the primary ATMARP Client.

FIG. 8 illustrates a continuation of the method 700 subsequent to a return 802 of the ATMARP Client 706. Initially, client 706 constructs a KEEP ALIVE message at 803. Thus, the return 802 may be signaled by the ATMARP Client 706 sending its KEEP ALIVE message (804) to the ATMARP Server 702. Upon receipt of the KEEP ALIVE Message, the ATMARP Server 702 will update the cache (806) indicating that the ARP Client 706 is active and thus reinstate the ARP Client 706 as the primary ARP Client for IP-2.

Figure 9:
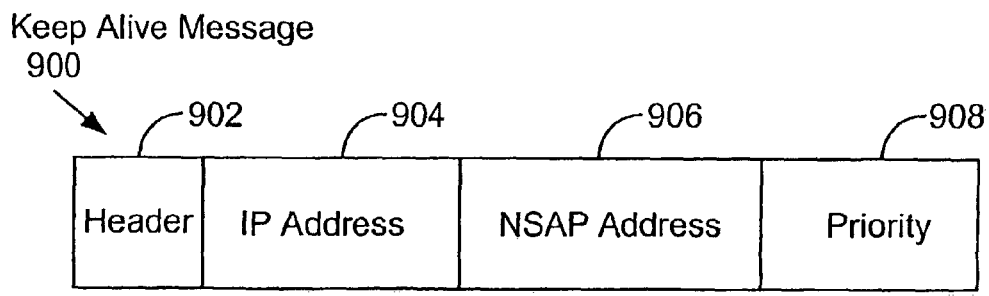
FIG. 9 illustrates the format of an exemplary KEEP ALIVE Message, which may be sent within a given time-out period from an ARP Client to the ATMARP Server.

FIG. 9 illustrates an exemplary KEEP ALIVE Message 900 that may be sent at a given time-out period from the ATMARP Client 706 to the ATMARP Server 702. The KEEP ALIVE Message 900 contains the necessary information for identifying the ATMARP Client 706 and reporting the ARP Client's status. An ATM header portion 902 provides information that references the KEEP ALIVE Message 900 to the ATM system 700 using suitable protocol. An IP address portion 904 allows referencing of the ARP Client to a specific IP address. An NSAP address portion 906 provides the lower level address designation within the ATMARP system 700. In addition, the KEEP ALIVE Message 900 may also include a priority section 908 which designates the priority level of the respective NSAP address within aggregate group.

Although the KEEP ALIVE Message 900 has been described with reference to uniquely identifying the status of a single ATMARP Client, the ATMARP Client 706 may also identify the status of all the sub-interfaces for an ATMARP Client. In the case where the KEEP ALIVE Message 900 is sent within a single ATM cell, an appropriately sized cell may be used. For example, a 52-byte cell may be used in which five bytes may be used for the ATM cell header 902, leaving 47 bytes for the remaining three or more sections. Obviously, the size of the cell may be varied to accommodate the needs of the system.

Note that an ATMARP request typically contains the NSAP address and IP address of the sending client. This information may also be used by the ATMARP Server to note that client is still alive. It may also be used to update an entry in its cache. See RFC 2225. Preferably, the KEEP ALIVE messages are send using SVCs having UBR service. This limits the network bandwidth dedicated to notifying the server of client availability.

Generally, standby methods of this invention can be implemented on software and/or hardware. For example, they can be implemented in an operating system kernel, in a separate user process, in a library package bound into network applications, on a specially constructed machine, or on a network interface card. In a preferred embodiment of this invention, standby group technology is partially implemented in server software for accessing and reporting the ATM address of a currently active network device. It is also partially implemented in client code on a network device. Both components may be implemented in an operating system or in an application running on an operating system.

Figure 10A:
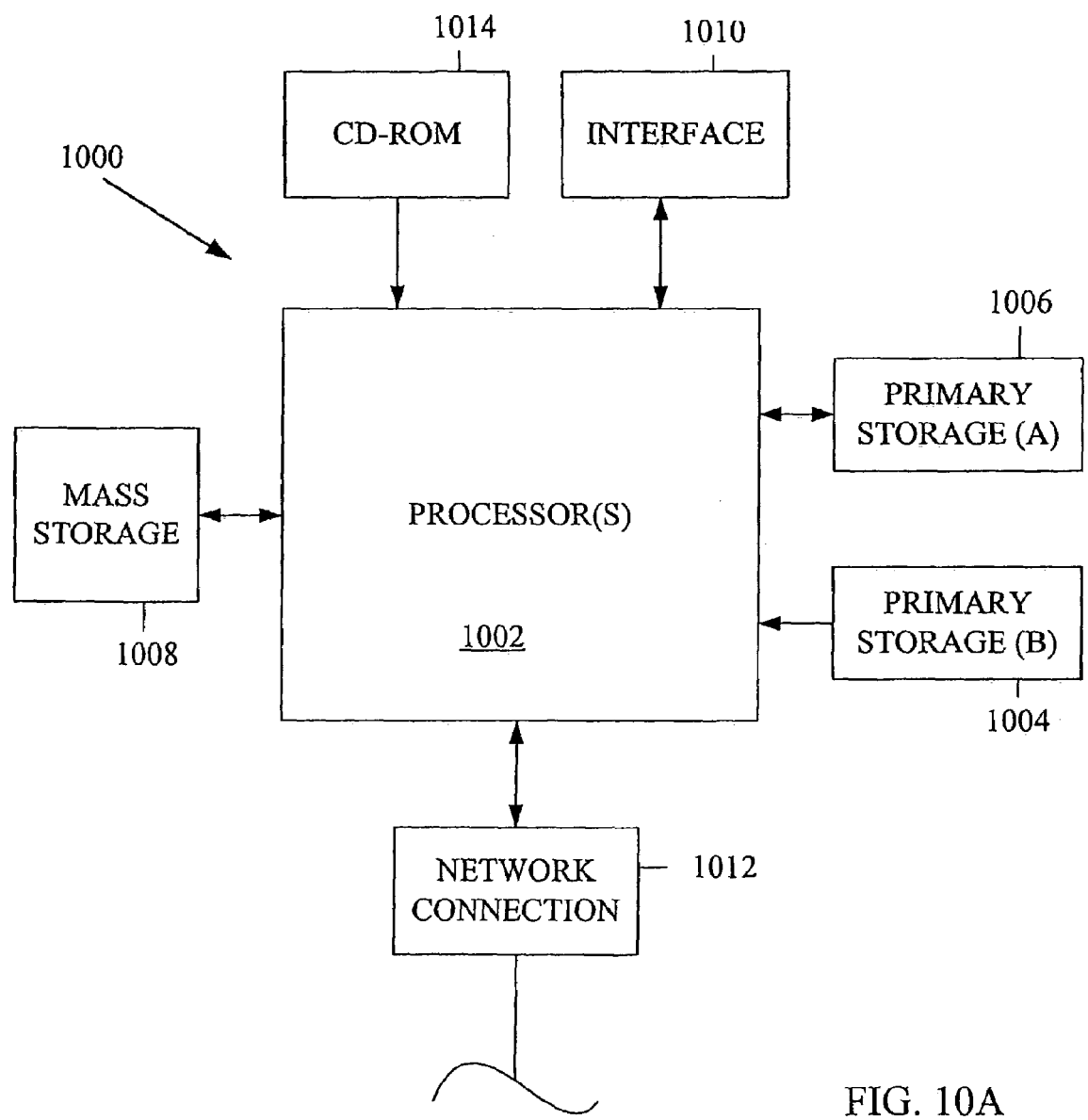
FIG. 10A is a block diagram of a hardware system or apparatus that may be employed to implement an ATMARP Server in accordance with an embodiment of this invention.

FIG. 10A illustrates a typical computer system that may be used to run server software in accordance with an embodiment of the present invention. The computer system 1000 includes any number of processors 1002 (also referred to as central processing units, or CPUs) that are coupled to storage devices including primary storage 1006 (typically a random access memory, or "RAM"), primary storage 1004 (typically a read only memory, or "ROM"). As is well known in the art, primary storage 1004 acts to transfer data and instructions uni-directionally to the CPU and primary storage 1006 is used typically to transfer data and instructions in a bi-directional manner. Both of these primary storage devices may include any suitable type of the computer-readable media described above. A mass storage device 1008 is also coupled bi-directionally to CPU 1002 and provides additional data storage capacity and may include any of the computer-readable media described above. The mass storage device 1008 may be used to store programs, data and the like and is typically a secondary storage medium such as a hard disk that is slower than primary storage. It will be appreciated that the information retained within the mass storage device 1008, may, in appropriate cases, be incorporated in standard fashion as part of primary storage 1006 as virtual memory. A specific mass storage device such as a CD-ROM 1014 may also pass data uni-directionally to the CPU.

CPU 1002 is also coupled to an interface 1010 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1002 is coupled to an ATM network using a network connection as shown generally at 1012. With such a network connection, it is contemplated that the CPU might receive information from the network, or might output information to the network in the course of performing the above-described method steps. The above-described devices and materials will be familiar to those of skill in the computer hardware and software arts.

A network device that is configured in accordance with this invention (as an ATMARP Client or an ATMARP Server) typically includes multiple network interfaces including frame relay and ISDN interfaces, for example. Specific examples of such network devices include routers and switches. For example, the standby systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. The invention may be at least partially implemented on a card (e.g., an interface card) for a network device or a general-purpose computing device.

Figure 10B:
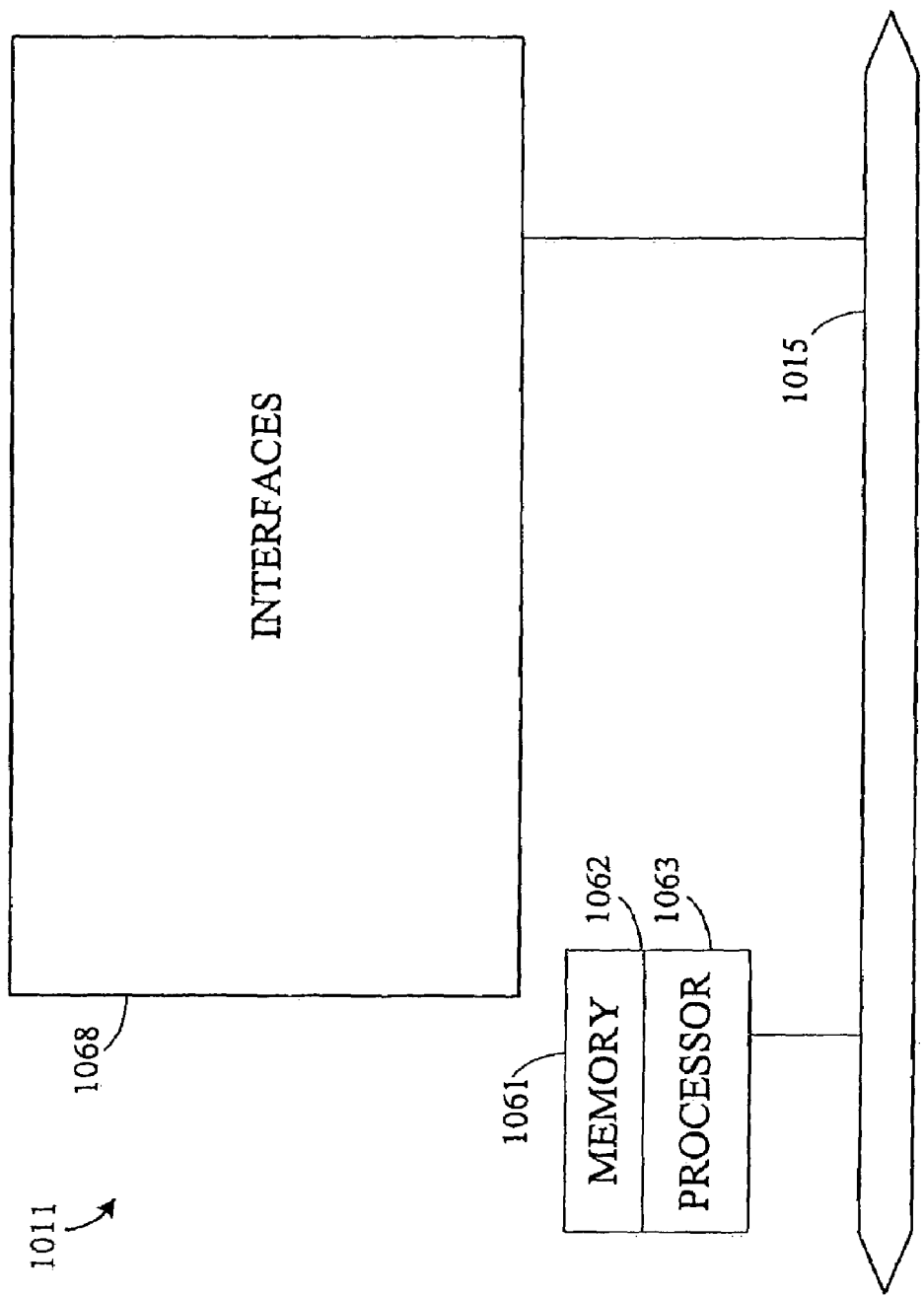
FIG. 10B is a block diagram of a hardware system or apparatus that may be employed to implement an ATMARP Client or Server in accordance with one embodiment of this invention.

Referring now to FIG. 10B, a router 1011 suitable for implementing the present invention includes a master central processing unit (CPU) 1062, interfaces 1068, and a bus 1015 (e.g., a PCI bus). When acting under the control of appropriate software or firmware, the CPU 1062 is responsible for such router tasks as routing table computations and network management. It may also be responsible for constructing or processing ATMARP requests, identifying the appropriate ATM address of an IP device, etc. It preferably accomplishes all these functions under the control of software including an operating system (e.g., the Internetwork Operating System (IOS®) of Cisco Systems, Inc.) and any appropriate applications software. CPU 1062 may include one or more processors 1063 such as a processor from the Motorola family of microprocessors or the MIPS family of microprocessors. In an alternative embodiment, processor 1063 is specially designed hardware for controlling the operations of router 1011. In a preferred embodiment, a memory 1061 (such as non-volatile RAM and/or ROM) also forms part of CPU 1062. However, there are many different ways in which memory could be coupled to the system.

The interfaces 1068 are typically provided as interface cards (sometimes referred to as "line cards"). Generally, they control the sending and receiving of data packets over the network and sometimes support other peripherals used with the router 1011. Among the interfaces that may be provided are ATM interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1062 to efficiently perform routing computations, network diagnostics, security functions, etc.

Although the system shown in FIG. 10B is one preferred router of the present invention, it is by no means the only router architecture on which the present invention can be implemented. For example, an architecture having a single processor that handles communications as well as routing computations, etc. is often used. Further, other types of interfaces and media could also be used with the router.

As indicated both server machines and client machines (e.g., routers) may employ one or more memories or memory modules configured to store program instructions for the general-purpose network operations and configuration operations described herein. The program instructions may control the operation of an operating system and/or one or more applications, for example. The memory or memories may also be configured to store relevant state information, data structures, etc., such as the ATMARP entries containing IP addresses, ATM addresses, and priorities described herein.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although only a few embodiments of the present invention have been described in detail, it should be understood that the present invention may be embodied in many other specific forms without departing from the spirit or scope of the invention. Particularly, the standby ATMARP Clients may be chosen based on the efficiency in which they route packages to an end destination as opposed to the critical nature of the associated entity or the number of IP addresses the ATMARP Client is responsible for.

Alternately, as the application of the ATMARP system 300 may vary over time, flexible control of the aggregate groups of ARP Clients and priority levels therein may be performed. For example, in the case where the ATM system original begins with 50 ATMARP Clients and then grows over time to 100 ARP Clients, the ATMARP Server 302 may reallocate the composition of each aggregate group or individual ATMARP Client. For example, the ARP Clients may be added or removed from an aggregate group or may have their priority within a group altered. Alternatively, if an ATMARP Client responsible as a primary ATMARP Client for one IP address and a stand-by ATMARP Client for another IP address continually becomes responsible as a primary of client for both IP addresses, the ATMARP Server 302 is capable of readjusting the aggregate groups in order alleviate the burden upon a single ARP Client.

Additionally, the allocation of ATMARP Clients within groups may be designated with respect to reserved bandwidths, data transmitting schemes or data classes such as video or simple email data. Although the foregoing invention has been described in some detail for purposes of clarity of understanding, it will be apparent that certain changes and modifications may be practiced within the scope of the appended claims.

What is claimed is:

1. A network system for providing a network service, comprising:
  a standby group of ATM network devices within an ATM network, each ATM network device within the standby group having its own ATM address and sharing a non-ATM network address with other members of the standby group; and
  a server which is configured to
    determine that a first member of the standby group of network devices is not available to provide the network service;
    identify a second member of the standby group of network devices to provide the network service; and
    promote the second member of the standby group of network devices to active status from standby status such that the second member provides the network service by handling packets destined for the shared non-ATM network address,
  wherein the determination by the server is performed based on at least one of (i) detecting that the first member has not opened a virtual circuit within a predetermined period, or (ii) detecting that the first member has not sent a KEEP ALIVE message within a predetermined period, and wherein the server is an ATM server in the ATM network, and wherein the server is not one of the ATM network devices in the standby group of ATM network devices.

2. The network system of claim 1 wherein a first member of the group of ATM network devices is configured to actively service a collection of network destinations without assistance from the remainder of the network ATM devices in the group of ATM network devices.

3. The network system of claim 1 wherein the ATM server can form virtual connections with each member of the standby group.

4. The network system of claim 3 wherein the ATM server can form virtual connections with each member of the standby group using an ARP protocol.

5. The network system of claim 1 wherein the non-ATM address being shared is unique to the group of network devices.

6. The network system of claim 5 wherein the non-ATM address being shared is an IP address.

7. The network system of claim 1 wherein the server is configured to detect that the first member is not active.

8. The network system claim 1 wherein the availability of each of the network devices in the group of network devices is stored in a single entity.

9. The network system of claim 1 wherein each of the network devices in the standby group of network devices has a priority ranking it with respect to the remaining network devices in the group of network devices.

10. The network system of claim 1, wherein the server is configured to determine that the second member has the highest priority of the remaining members of the standby group.

11. The network system of claim 10, wherein the server is configured to determine that the second member has the highest priority prior to identifying the second member of the standby group of network devices to provide the network service.

12. The network system of claim 1, wherein the server is configured to use a list specifying members of the standby group and relative priorities of those members.

13. The network system of claim 1, wherein the server is configured to provide ARP replies identifying the ATM address of the second member of the standby group after identifying the second member.

14. The network system of claim 1, wherein each of the ATM network devices is a router or a bridge.

15. The network system of claim 1, wherein the server provides ATMARP information for each of the ATM network devices in the standby group.

16. The network system of claim 1, wherein the server is an ATMARP server adapted for resolving an ATMARP request that includes the non-ATM network address such that the server sends an ATMARP reply that includes the ATM address of a member of the standby group of ATM network devices that has an active status.

17. The network system of claim 1, wherein the availability of each of the network devices in the group of network devices is stored at a single entity, wherein the single entity is the server.

18. The network system of claim 1, wherein the server is further configured to update information associated with the first member of the standby group of network devices to indicate that the first member of the standby group of network devices is not available.

19. The network system of claim 1, wherein the server is an ATMARP server adapted for resolving an ATMARP request that includes the non-ATM network address that is shared by members of the standby group of ATM network devices such that the server sends an ATMARP reply that includes the ATM address of the second member of the standby group of ATM network devices, wherein the server has promoted the second member of the standby group from standby status to active status.

20. A network system for providing a network service using a first network device, comprising:
 a standby group of ATM network devices within an ATM network, each ATM network device within the standby group having its own ATM address and sharing a non-ATM network address with other members of the standby group; and
 a server which is configured to
  determine that the first network device is available by at least one of (i) detecting that the first network device has opened a virtual circuit within a predetermined period, or
  (ii) detecting that the first network device has sent a KEEP ALIVE message within a predetermined period;
  send a notification identifying the first network device by ATM address and the shared non-ATM network address, thereby enabling the server to select the first network device to handle packets addressed to the non-ATM network address that is shared with other members of the standby group; and
  receive one or more packets destined for the shared non-ATM network address,
 wherein the server is an ATM server in the ATM network, and wherein the notification also specifies a priority of the first network device in the standby group.

21. The network system of claim 20, wherein the notification also specifies a priority of the first network device within the standby group.

22. The network system of claim 20, wherein the server is configured to send an ATMARP request.

23. The network system of claim 20, wherein the first network device exists in a standby state prior to receiving the one or more packets destined for the shared non-ATM network address, and wherein while in the standby state, the first network device does not receive packets destined for the shared non-ATM network address.

24. The network system of claim 20, wherein the shared non-ATM network address is a standby group IP address and the one or more packets destined for the standby group IP address.

25. An ATM network comprising:
 a network device in the ATM network having at least one ATM network address; and
 a server which is configured to
  assign the network device to a first group of network devices having a first non-ATM network address; and
  promote the network device from a standby status to an active status in which the network device services the non-ATM network address associated with the first group of network devices,
 wherein the server is configured to promote the network device in response to at least one of (i) detecting that another network device in the first group of network devices has not opened a virtual circuit within a predetermined period, or (ii) detecting that another network device in the first group of network devices has not sent a KEEP ALIVE message within a predetermined period, and wherein the server is an ATM server in an ATM network, and wherein the server is not one of the network devices in the first group of network devices.

26. The ATM network of claim 25, wherein the server is configured to assign the network device to a second group of network devices having a second non-ATM network address which is different from the first non-ATM network address.

27. The ATM network of claim 26, wherein the server is configured to promote the network device from the standby statics to the active status based on a priority designation of the network device relative to priority designations of other network devices within the first group of network devices.

28. The ATM network of claim 25, wherein the server is an ATMARP server adapted for resolving an ATMARP request that includes the first non-ATM network address associated with the first group of network devices such that the server sends an ATMARP reply that includes the ATM address of the network device, wherein the server has promoted the network device from standby status to active status.

29. An ATM network comprising:
a network device in the ATM network, the network device having at least one ATM network address; and
a server which is configured to
assign the network device to a group of network devices having a shared non-ATM network address;
determine whether the network device is not available by at least one of (i) determining whether the network device has not opened a virtual circuit within a predetermined period, or (ii) determining whether the network device has not sent a KEEP ALIVE message within a predetermined period; and
if the network device is not available, change the network device from an active status in which the network device services the non-ATM network address to a standby status in which the network device does not service the non-ATM network address,
wherein the server is an ATM server in an ATM network, and wherein the server is not one of the network devices in the group of network devices.

30. The ATM network of claim 29, wherein the server is an ATMARP server adapted for resolving an ATMARP request that includes the non-ATM network address that is shared by the group of network devices such that the server sends an ATMARP reply that includes the ATM address of a member of the group of network devices that has an active status.

31. An ATM network comprising:
a plurality of network devices, and
a server including:
one or more processors;
a memory; and
at least one interface for establishing a connection between the server and a network device of the plurality of network devices,
wherein the server is configured to provide a collection of entries wherein each entry in the collection of entries corresponds to a network device of the plurality of network devices, wherein one or more of the entries includes the corresponding network device's ATM address, a shared non-ATM address used by the corresponding network device and one or more others of the plurality of network devices, and a value used in determining whether the network device corresponding to the entry is currently acting as the device having the non-ATM address,
wherein the server is configured to adjust the value when it is determined that the network device currently acting as the device having the non-ATM address is no longer available as determined by at least one of (i) detecting that the network device has not opened a virtual circuit within a predetermined period, or (ii) detecting that the network device has not sent a KEEP ALIVE message within a predetermined period,
wherein the server is an ATM server in an ATM network, and wherein the server is not one of the plurality of network devices.

32. The ATM network of claim 31, wherein the processor is configured to run an ATMARP protocol.

33. The ATM network of claim 31, wherein the at least one interface is an ATM interface.

34. The ATM network of claim 31, wherein the connection is an ATM virtual circuit connection.

35. The ATM network of claim 31 wherein the shared non-ATM address for a first entry in the collection of entries is the same as the shared non-ATM address for a second entry in the collection of entries.

36. The ATM network of claim 35 wherein the value for the first entry in the collection of entries is compared with the value for the second entry in the collection of entries for determining whether the network device corresponding to the entry is currently acting as the device having the non-ATM address.

37. The ATM network of claim 31 wherein the collection of entries is stored in non-volatile memory.

38. The ATM network of claim 31, wherein the collections of entries is stored as a logical table.

39. The ATM network of claim 31, wherein the server contains a value used in determining whether the network device is currently acting as the device having the non-ATM address.

40. The ATM network of claim 31, wherein the server is an ATMARP server adapted for resolving an ATMARP request that includes the non-ATM address such that the server sends an ATMARP reply that includes the ATM address of one of the plurality of network devices currently acting as the device having the non-ATM address.

41. An ATM network comprising:
a plurality of network devices;
a server; and
a network device including
one or more processors;
at least one interface for establishing a connection between the network device and a second network device;
an ATM address; and
a non-ATM address shared by at least one other network device in the plurality of network devices of the ATM network,
wherein the one or more processors is configured to perform at least one of the following functions: (i) to open a virtual circuit within a predetermined period, or (ii) to send a KEEP ALIVE message within a predetermined period, and
wherein the server is an ATM server in the ATM network, and wherein the server is not one of the plurality of network devices;
wherein the server is configured to modify a status of the network device from an active status in which the network device services the non-ATM network address to a standby status in which the network device does not service the non-ATM network address.

42. The ATM network of claim 41 further including a second non-ATM address.

43. The ATM network of claim 42 wherein the second non-ATM address is shared with at least one other network device in the plurality of network devices of the ATM network.

44. The ATM network of claim 41 wherein the at least one interface includes a plurality of sub-interfaces.

45. The ATM network of claim 41 wherein the connection is a virtual connection.

46. The ATM network of claim 45 wherein the virtual connection is an SVC.

47. The ATM network of claim 41 wherein the processor is configured to run and act as an ATMARP Client.

48. The ATM network of claim 41 wherein the network device is a router or switch.

49. The ATM network of claim 41 further including a second ATM address.

50. The ATM network of claim 41, wherein the server is an ATMARP server adapted for resolving an ATMARP request that includes the non-ATM address such that the server sends an ATMARP reply that includes the ATM address of one of the plurality of network devices having an active status.

51. A network system for providing a network service, comprising:

a plurality of means within an ATM network, each means within a standby group having its own ATM address and sharing a non-ATM network address with other members of the standby group;

means for determining that a first member of the standby group of network devices is not available to provide the network service; and means for identifying by a server that is not a member of the standby group of network devices a second member of the standby group of network devices to provide the network service; and means for promoting by the server the second member of the standby group from standby status to active status such that the second member of the standby group provides the network service by handling packets destined for the shared non-ATM network address, wherein determining that the first member of the standby group of network devices is not available comprises at least one of (i) detecting that the first member has not opened a virtual circuit within a predetermined period, or (ii) detecting that the first member has not sent a KEEP ALIVE message within a predetermined period, and wherein the server is an ATM server in the ATM network, and wherein the server is not one of the network devices in the standby group of network devices.

52. The network system of claim 51, further comprising:

means for responding by the server to a request that includes the non-ATM network address that is shared by members of the standby group with the ATM address of one of the members of the standby group having an active status.

* * * * *

UNITED STATES PATENT AND TRADEMARK OFFICE
CERTIFICATE OF CORRECTION

PATENT NO.        : 7,620,056 B2                                                                Page 1 of 1
APPLICATION NO.   : 10/603500
DATED             : November 17, 2009
INVENTOR(S)       : Prasad Miriyala It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1164 days.

Signed and Sealed this

Fourteenth Day of December, 2010

David J. Kappos
*Director of the United States Patent and Trademark Office*